(12) United States Patent
Sergi et al.

(10) Patent No.: US 8,175,546 B1
(45) Date of Patent: May 8, 2012

(54) RECEIVE ANTENNA INTERFACE FOR AN RF TRANSCEIVER

(75) Inventors: Paul D. Sergi, Peninsula, OH (US); Charles T. Rauch, Barnesville, GA (US)

(73) Assignee: PDS Electronics, Inc., Tallmadge, OH (US)

( * ) Notice: Subject to any disclaimer, the term of this patent is extended or adjusted under 35 U.S.C. 154(b) by 487 days.

(21) Appl. No.: 12/584,819

(22) Filed: Sep. 14, 2009

(51) Int. Cl.
*H04B 1/44* (2006.01)

(52) U.S. Cl. ......... 455/78; 455/90; 455/180.2; 455/430; 455/88; 455/82; 342/357.55; 342/357.88; 342/47; 343/702; 343/741; 343/744; 343/860

(58) Field of Classification Search ............... 455/78, 455/560, 82, 88, 63.4, 430, 180.2, 90; 342/357.55, 342/357.48, 47; 343/702, 744
See application file for complete search history.

(56) References Cited

U.S. PATENT DOCUMENTS

| | | | |
|---|---|---|---|
| 6,292,139 B1 * | 9/2001 | Yamamoto et al. | 343/700 MS |
| 7,127,370 B2 * | 10/2006 | Kelly et al. | 702/151 |
| 7,626,498 B2 * | 12/2009 | Aiki et al. | 340/539.12 |
| 7,969,373 B2 * | 6/2011 | Tsilioukas et al. | 343/744 |
| 2004/0230352 A1 * | 11/2004 | Monroe | 701/3 |
| 2005/0088296 A1 * | 4/2005 | Lee | 340/539.12 |
| 2006/0214805 A1 * | 9/2006 | Boujon | 340/573.1 |

\* cited by examiner

*Primary Examiner* — Edward Urban
*Assistant Examiner* — Ganiyu A Hanidu
(74) *Attorney, Agent, or Firm* — Renner, Kenner, Greive, Bobak, Taylor & Weber

(57) ABSTRACT

The present receive antenna interface for an RF (radio frequency) transceiver includes a transmitting and receiving antenna. The receive antenna interface also includes a relay and an electrically-isolated transmit-ground connector that are configured such that the receiving antenna is not capable of being used by the transceiver unless the transmit-ground connector is connected to a ground-on-transmit connector provided by the transceiver. As a result, damage from the accidental transmission of RF signals into the receiving circuitry of the transceiver is prevented.

18 Claims, 2 Drawing Sheets

RECEIVE ANTENNA INTERFACE FOR AN RF TRANSCEIVER

TECHNICAL FIELD

The present invention relates to a receive antenna interface for an RF (radio frequency) transceiver that switches between a receiving antenna and a transmitting antenna. More specifically, the present invention is directed to a receive antenna interface for a transceiver that provides an electrically-isolated transmit-ground connector that when connected to a ground-on-transmit connector of the transceiver enables the operation of a receiving antenna that is coupled to the interface.

BACKGROUND ART

It is known that the use of a separate receiving antenna for the reception of "low-band" HF (high-frequency) signals provides significant benefits over using a dedicated transmitting antenna in order to receive such RF signals. For example, transmitting antennas used to receive signals below 14 MHz collect significant amounts of noise during reception, thus impairing the establishment of 2-way communication with another, especially when DXing on the 160 and 80 meter wavelength bands. Unfortunately, most HF transceivers generally fail to provide a separate built-in receive antenna port and switching system to enable the use of individual transmitting and receiving antennas. Moreover, HF transceivers that are manufactured with a separate receive antenna input typically do not provide the user with the ability to readily switch between their default transmitting antenna and the separate receiving antenna.

Thus, there is a need for a receive antenna interface for an RF transceiver that provides a receiving antenna input. Additionally, there is a need for a receive antenna interface that provides a switching relay that allows use of the receiving antenna if a transmit-ground connector provided by the interface is connected to a ground-on-transmit connector provided by a transceiver. Furthermore, there is a need for a receive antenna interface that automatically connects the transceiver to the transmitting antenna when power is off and disconnects the receiving antenna from the transceiver when the transceiver is transmitting.

DISCLOSURE OF THE INVENTION

It is thus an object of one aspect of the present invention to provide an interface to enable a transceiver to be used with a receiving antenna.

It is an object of another aspect of the present invention to provide an interface, as above, which enables the use of a receiving antenna if a transmit-ground connector is connected to a ground-on-transmit connector of a transceiver.

These and other objects of the present invention, as well as the advantages thereof over existing prior art forms, which will become apparent from the description to follow, are accomplished by the improvements hereinafter described and claimed.

In general, a receive antenna interface for a transceiver including a ground-on-transmit connector includes a fixed ground connection and a switched ground connection. The receive interface includes a chassis and a relay having transmitting and receiving antenna terminals that are adapted to be coupled to respective transmitting and receiving antennas. The transmitting antenna terminal is selectively coupled by the relay to a transceiver interface terminal that is adapted to be coupled to a transceiver communication terminal in a first state. The receiving antenna terminal is selectively coupled to the transceiver interface terminal in a second state, wherein the relay includes a control line. A ground control circuit is carried by the chassis and is coupled to the control line to control the states of the relay. The ground control circuit also includes a transmit-ground connector that has a first and a second grounding terminal that are adapted to be coupled to the fixed ground connection and the switched ground connection of the ground-on-transmit connector respectively, whereby the first and second ground terminals are electrically isolated from the chassis. When the fixed ground connection of the ground-on-transmit connector is coupled to the first grounding terminal, the ground control circuit places the relay in the second state, and when the switched ground connection is switched to ground and the relay is in the second state, the ground control circuit places the relay in the first state.

In accordance with another aspect of the invention, a receive antenna interface for a transceiver includes a chassis and a relay having transmitting and receiving antenna terminals adapted to be coupled to a respective transmitting and receiving antenna. The relay is configured to selectively couple the transmitting antenna terminal to a transceiver interface terminal in a first state and to selectively couple the receiving antenna terminal to the transceiver interface terminal in a second state. The relay also includes a control line to switch the relay into one of the states. A transistor has a collector terminal that is coupled to the control line, whereby the transistor is configured to place the relay into either of the first or second state. A transmit-ground connector carried by the chassis has first and second grounding terminals that are electrically isolated from the chassis, such that the first grounding terminal is coupled to an emitter terminal of the transistor, and the second grounding terminal is coupled to a base terminal of the transistor. When the first grounding terminal is grounded, the transistor places the relay into the second state, and when the first and second grounding terminals are grounded, the transistor places the relay into the first state.

In accordance with another aspect of the invention, a system for transmitting and receiving signals includes a transceiver having a communication interface terminal and a ground-on-transmit terminal, the ground-on-transmit terminal having a fixed ground connection and a switched ground connection configured to be selectively grounded or ungrounded. A receive antenna interface having a chassis and a relay having transmitting and receiving antenna terminals are adapted to be coupled to respective transmitting and receiving antennas. The transmitting antenna terminal is selectively coupled to the transceiver communication terminal in a first state, and the receiving antenna terminal is selectively coupled to the transceiver interface terminal in a second state. The relay provided by the interface also includes a control line and a ground control circuit that is carried by the chassis. The ground control circuit is coupled to the control line to control the states of the relay. In addition, the ground control circuit provides a transmit-ground connector having a first and a second grounding terminal that are coupled to the fixed ground connection and the switched ground connection of the ground-on-transmit connector respectively, whereby the first and second ground terminals are electrically isolated from the chassis. When the fixed ground connection of the ground-on-transmit connector is coupled to the first grounding terminal, the ground control circuit places the relay in the second state, and when the switched ground connection is switched to ground when the relay is in the second state, the ground control circuit places the relay in the first state.

A preferred exemplary receive antenna interface for an RF transceiver according to the concepts of the present invention is shown by way of example in the accompanying drawings without attempting to show all of the various forms and modifications in which the invention might be embodied, the invention being measured by the appended claims and not by the details of the specification.

PREFERRED EMBODIMENT FOR CARRYING OUT THE INVENTION

Figure 1:
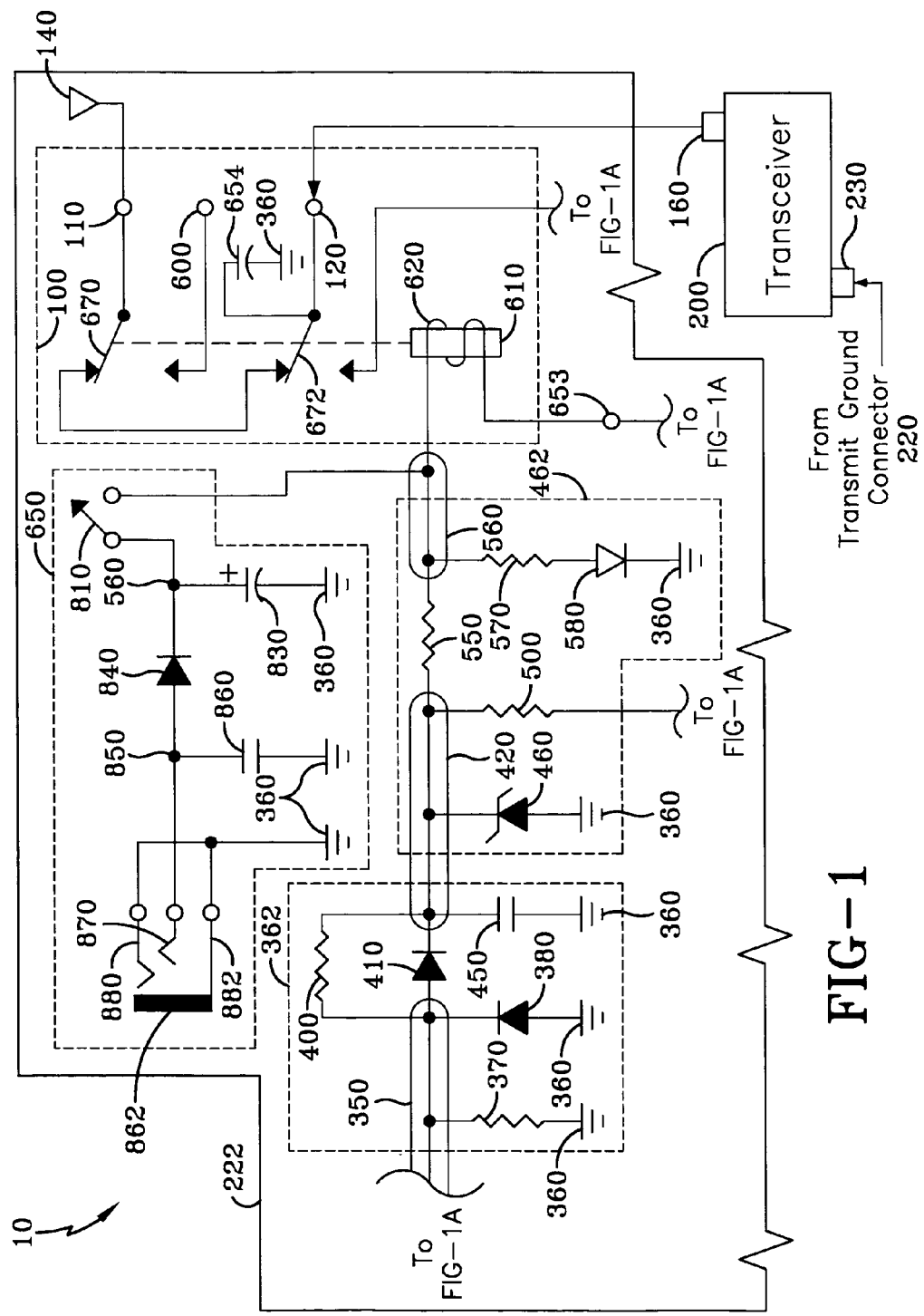
FIGS. 1 and 1A together represent a schematic diagram of the receive interface for an RF transceiver in accordance with the concepts of the present invention.
Figure 1A:
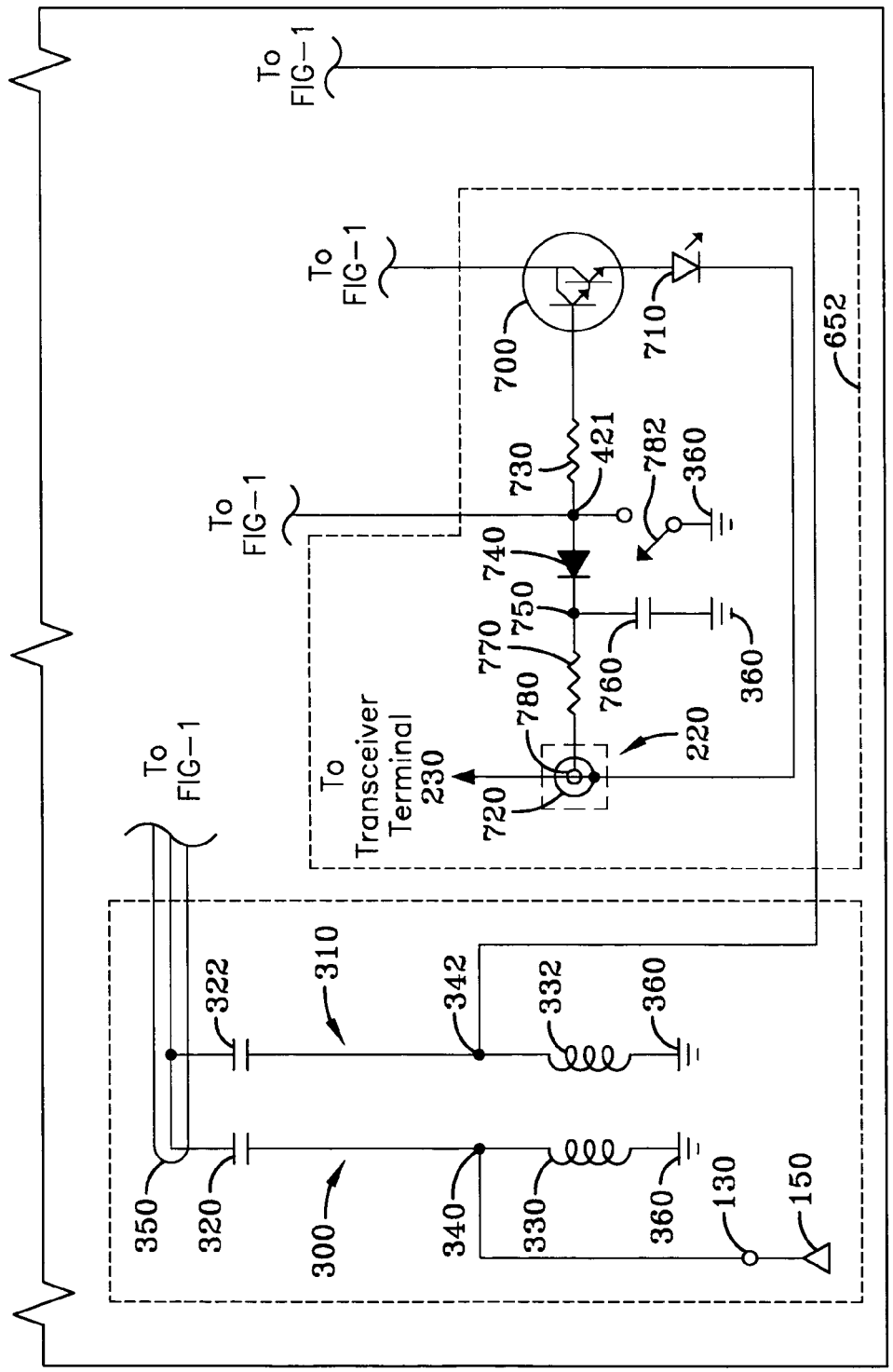

A receive interface for an RF transceiver is identified by the numeral 10 and includes a relay 100 that has a transmitting antenna terminal 110, a transceiver interface terminal 120, and a receiving antenna terminal 130. Specifically, the transmitting and receiving antenna terminals 110 and 130 are configured to be attached to suitable transmitting and receiving antennas 140 and 150, while the transceiver interface terminal 120 is configured to be attached to a transceiver communication terminal 160 provided by an RF transceiver 200. The receive interface 10 also includes a transmit-ground connector 220 that is in electrical communication with the relay 100 but is electrically isolated from the chassis or housing 222 of the receive interface 10. The receive interface 10 is configured such that the transceiver 200 can utilize the receiving antenna 150, depending on whether the transmit-ground connector 220 is coupled to a ground-on-transmit connector 230 provided by the transceiver 200. Thus, if the transmit-ground connector 220 of the receive interface 10 is coupled to the ground-on-transmit connector 230 of the transceiver 200, the relay 100 is controlled to allow the transceiver 200 to independently utilize the transmitting antenna 140 to transmit RF signals and the receiving antenna 150 to receive RF signals. Whereas, if the transmit-ground connector 220 of the receive interface 10 is not coupled to the ground-on-transmit connector 230 of the transceiver 200, the relay 100 is controlled so that the transceiver 200 can utilize only the transmitting antenna 140.

The receive interface 10 includes a filtering circuit 280 that provides two parallel legs 300 and 310 that contain respective capacitors 320, 322 and inductors 330, 332. In particular, the capacitors 320, 322 are coupled in series at one end to respective inductors 330,332, forming respective nodes 340 and 342, while the other end of the capacitors 320, 322 are coupled together to form a node 350, and the other end of the inductors 330, 332 are coupled to ground 360. Coupled to nodes 340 and 342 is the receiving antenna terminal 130 that is configured to be coupled to the receiving antenna 150. In one aspect, the filtering circuit 280 provides attenuation of low frequency RF interference that may be associated with the desired signal that is being received by the transceiver 200.

Coupled to the filtering circuit 280 is an antenna input protection circuit 362 that includes a resistor 370 that is coupled at one end to node 350, while the other end is coupled to ground 360. The input protection circuit 362 also includes a diode 380 that is coupled in parallel with the resistor 370, such that its cathode is coupled to node 350, and its anode is coupled to ground 360. Input protection circuit 362 is additionally provided with a parallelly-connected resistor 400 and diode 410, such that the anode of the diode 410 is coupled to node 350, while the cathode is coupled to a node 420.

Coupled between node 420 and ground 360 is a parallelly-coupled capacitor 450 that is in parallel with a zener diode 460 provided by a biasing circuit 462, whereby the cathode of the zener diode 460 is coupled to node 420, and the anode is coupled to ground 360. The biasing circuit 462 also includes a resistor 500 that is coupled at one end to node 420 and at another end to a node 421, while a resistor 550 is also coupled at one end to node 420 and at another end to a node 560. The biasing circuit 462 also includes a resistor 570 that is coupled at one end to node 560 and at another end in series with the anode of a light emitting diode (LED) 580, such as a green LED, while the cathode of the diode 580 is coupled to ground 360. It should be appreciated that the biasing circuit 462 is configured to enable the operation of a Darlington transistor 700 to be discussed below.

Coupled to the biasing circuit 462 is the relay 100 that includes the transmitting antenna terminal 110, an accessory terminal 600, the transceiver interface terminal 120, and the receiving antenna terminal 130. It should be appreciated that the accessory terminal 600 is configured to be connected to optional accessory, whereby when the transceiver 200 is in a receive mode, the transmitting antenna 140 operates as a receiving antenna, which is phased against the receiving antenna 150 to achieve directional antenna operation. The resultant phasing of antennas 140 and 150 is then fed to receiving antenna terminal 130 for delivery to the transceiver 200. Alternatively, the accessory terminal 600 may be coupled to the input of a receiving preamplifier, with the output of the preamplifier coupled to terminal 130. Such a configuration boosts the power of weak signals, allowing the transceiver 200 to receive them. However, it should be appreciated that the accessory terminal 600 is left disconnected if none of the additional accessories discussed above are being used in association with the receive interface 10.

The relay 100 also includes a magnet 610 that is selectively energized by a wire coil 620 disposed thereabout that is coupled at one end to a power circuit 650 via node 560 and at another end to a ground control circuit 652 via a control line 653. In one aspect, the relay 100 also includes a capacitor 654, such as a 22 pF disc or mica capacitor, between the transceiver interface terminal 120 and ground 360, which serves to compensate for the length of the wire used to connect the transceiver 200 to the transceiver interface terminal 120. Moreover, it should be appreciated that the relay 100 comprises a fast-acting or fast-switching relay that is suitable for switching RF signals. For example, the relay 100 may comprise a 200-watt relay with a 4-millisecond delay time. In yet another aspect, the relay 100 may be configured so that it diverts transmitted RF signals from the transceiver 200 in a manner to allow quadriphase shift keying (QSK) operation that provides full break-in, duplex communication while listening to the receiving antenna 150.

Specifically, relay 100 can be a double-pole, double-throw relay that is configured with switches 670 and 672 that, in their normal first state, couple the transmitting antenna terminal 140 to the transceiver interface terminal 120 to enable the transceiver 200 to transmit signals via the transmitting antenna 140. When the coil 620 energizes the magnet 610, the switches 670, 672 are moved to a second state, whereupon the receiving antenna 150 is coupled to the transceiver interface terminal 120 via node 342 to enable the transceiver 200 to receive signals from the receiving antenna 150, while the transmitting antenna 140 is coupled to the accessory terminal 600.

One end of the coil 620 of the relay 100, which forms the control line 653, is coupled to a collector terminal of a Darlington transistor 700 of the ground control circuit 652, while the emitter terminal of the Darlington transistor 700 is coupled in series with the anode of a light emitting diode (LED) 710, such as a red LED, and the cathode terminal of the light emitting diode 710 is coupled to a first grounding terminal 720 of the transmit-ground connector 220. The ground control circuit 652 also includes a resistor 730 that is coupled at one end to the base of the Darlington transistor 700 and coupled at another end to node 421. The ground control circuit 652 also includes a diode 740 that is coupled at its anode to node 421 and at its cathode to a node 750. A capacitor 760 is coupled between node 750 and ground 360, while a resistor 770 is coupled between node 750 and a second grounding terminal 780 that is provided by the transmit-ground connector 220. Specifically, first and second grounding terminals 720, 780 of the transmit-ground connector 220 are electrically isolated from the ground 360 that is established by the chassis or housing 222 that carries or supports the components of the receive antenna interface 10. Also provided by the ground control circuit 652 is a mode switch 782 that is coupled between node 421 and ground 360, the function of which will be hereinafter discussed in detail.

Power is supplied to the receive antenna interface 10 via the power circuit 650 that includes an on/off switch 810 that is coupled at one end to the coil 620 and at another end to the node 560. Coupled at one end to the ON/OFF switch 810 at a node 560 is a capacitor 830 that is coupled at its other end to ground 360. The power circuit 650 also includes a diode 840 that is coupled at its cathode to node 560 and coupled at its anode terminal to a node 850, while a capacitor 860 is also coupled between the node 850 and ground 360. A power connector 862 includes a power terminal 870 that is coupled to node 850 and grounding terminals 880 and 882 that are coupled to ground 360.

It should be appreciated that the power connector 862 is configured to receive D.C. (direct current) power, such as +12VDC, from any suitable power source, such as that supplied from an electrical transformer that converts A.C. (alternating current) power received from an electrical outlet into D.C. power. As such, the ON/OFF switch 810 has the effect of turning the receive antenna interface 10 on and off as desired by the user.

Thus, to place the receive antenna interface 10 into operation, the user attaches the receiving antenna 150 to the receiving antenna terminal 130 and attaches the transmitting antenna 140 to the transmitting antenna terminal 110, while also connecting the transceiver interface terminal 120 to the communication interface terminal 160 of the transceiver 200. However, because the enablement of the transmitting and receiving antennas 140,150 is controlled dependent on whether the first and second grounding terminals 720, 780 of the transmit-ground connector 220 are grounded by connection to the ground-on-transmit connector 230 of the transceiver 200, the ground-on-transmit connector 230 is configured to provide a fixed ground connection to the first grounding terminal 720, while also providing a switched ground connection to the second grounding terminal 780 of the transmit-ground connector 220. In other words, once the first grounding terminal 720 is coupled to the ground-on-transmit connector 230, the first grounding terminal 720 is grounded at the transceiver 200. However, the second grounding terminal 780 is selectively grounded by the operation of the transceiver 200, such that when the transceiver 200 is transmitting, the second grounding terminal 780 is grounded, and when the transceiver 200 is not transmitting, the second grounding terminal 780 is not grounded and allowed to float.

As such, when the transmit-ground connector 220 is coupled to the ground-on-transmit terminal 230 of the transceiver 200 and the ON/OFF switch 810 is turned on, the emitter of the Darlington transistor 700 and LED 710 are pulled to ground through the first grounding terminal 720 by the fixed ground connection that is provided by the transceiver 200 via the ground-on-transmit connector 230. As a result, the Darlington transistor 700 permits electrical current to pass through the control line 653, the LED 710, and the relay coil 620, thereby illuminating the LED 710. As a result, the relay 100 switches from its normal first state, where the transmitting antenna 140 is coupled to the transceiver interface terminal 120, to a second state, where the receiving antenna 150 is coupled to the transceiver 200, while the transmitting antenna 140 is disconnected therefrom and connected to the accessory terminal 600. Thus, by attaching the transmit-ground connector 220 to the ground-on-transmit connector 230, the transceiver 200 is permitted to receive RF signals via the receiving antenna 150.

Alternatively, when the transceiver 200 is operated in a transmission mode to transmit RF signals, the switched ground connection provided by the ground-on-transmit connector 230, which is connected to the second grounding terminal 780 of the transmit-ground connector 220, is coupled to ground. As a result, the voltage at node 520 is pulled to ground or to low/negative voltage potential, thereby turning transistor 700 off, thereby preventing electrical current from passing through the coil 620 via the control line 653. As such, the relay switches 670, 672 couple the transmitting antenna 140 to the transceiver interface terminal 120, so as to allow the transceiver 200 to transmit signals.

Additionally, the mode switch 782 is configured such that when it is open, the receive interface 10 is configured to operate in the manner previously discussed above. However, when the mode switch 782 is closed, thereby coupling node 421 to ground 360, the Darlington transistor 700 is turned off, and the switches 670, 672 of the relay 100 return to their normal first position, whereby the transmitting antenna 140 is coupled to the transceiver 200, allowing the transceiver 200 to receive signals using the transmitting antenna 140. The mode switch 782 also provides momentary switching action, such that as long as the user keeps the switch 782 depressed, the switches 670, 672 of the relay 100 are kept at their normal first position until the user releases the mode switch 782. Once the mode switch 782 is released, the relay switches 670, 672 are moved to couple the receiving antenna 150 to the transceiver 200, thereby resuming normal operation in which the transceiver 200 receives RF signals via the receiving antenna 150 when the transceiver 200 is in a receiving mode and transmits RF signals via the transmitting antenna 140 when the transceiver 200 is in a transmitting mode.

It will, therefore, be appreciated that one advantage of one or more embodiments of the receive antenna interface for an RF transceiver is that if power to the receive antenna interface is lost, the RF output from the transceiver is automatically diverted to the transmitting antenna to prevent damage to the receiving portion of the transceiver. Another advantage of the present invention is that the receive antenna interface allows a receiving and a transmitting antenna to be interfaced with a HF (high frequency) transceiver, allowing the transceiver to receive and transmit RF signals. Yet another advantage of the present invention is that the receive antenna interface prevents the use of the receiving antenna unless the transmit-ground connector is coupled to a ground-on-transmit connector provided by the transceiver to prevent RF power from the transceiver from accidentally being transmitted into the receiving circuitry of the transceiver.

What is claimed is:

1. A receive antenna interface for a transceiver including a ground-on-transmit connector that provides a fixed ground connection and a switched ground connection, the receive interface comprising:
   a chassis;
   a relay having transmitting and receiving antenna terminals that are adapted to be coupled to respective transmitting and receiving antennas, said transmitting antenna terminal being selectively coupled by said relay to a transceiver interface terminal adapted to be coupled to a transceiver communication terminal in a first state, and said receiving antenna terminal being selectively coupled to said transceiver interface terminal in a second state, wherein said relay includes a control line; and
   a ground control circuit carried by said chassis, said ground control circuit coupled to said control line to control said states of said relay, said ground control circuit including a transmit-ground connector having a first and a second grounding terminal that are adapted to be coupled to the fixed ground connection and the switched ground connection of the ground-on-transmit connector respectively, said first and second ground terminals being electrically isolated from said chassis;
   wherein when the fixed ground connection of the ground-on-transmit connector is coupled to said first grounding terminal, said ground control circuit places said relay in said second state, and when the switched ground connection is switched to ground and said relay is in said second state, said ground control circuit places said relay in said first state.

2. The receive antenna interface of claim 1, further comprising a filtering circuit coupled to said receiving antenna terminal to filter signals received by said receiving antenna.

3. The receive antenna interface of claim 1, further comprising a power source coupled to said control line, such that when said power source is disabled, said relay is placed in said first state.

4. The receive antenna interface of claim 1, wherein said relay has a switching delay of about 4 milliseconds or less.

5. The receive antenna interface of claim 1, wherein said ground control circuit includes a mode switch that is operatively coupled between said relay and ground, such that when said mode switch is closed and said relay is in said second state, said relay is placed into its first state, such that said transmitting antenna terminal is coupled to said transceiver interface terminal.

6. The receive antenna interface of claim 5, wherein said mode switch is a momentary switch.

7. A receive antenna interface for a transceiver comprising:
   a chassis;
   a relay having transmitting and receiving antenna terminals adapted to be coupled to a respective transmitting and receiving antenna, said relay configured to selectively couple said transmitting antenna terminal to a transceiver interface terminal in a first state, and selectively coupling said receiving antenna terminal to said transceiver interface terminal in a second state, said relay having a control line to switch said relay into one of said states;
   a transistor having a collector terminal coupled to said control line, said transistor configured to place said relay into either of said first or second state; and
   a transmit-ground connector carried by said chassis, said transmit-ground connector having first and second grounding terminals electrically isolated from said chassis, such that said first grounding terminal is coupled to an emitter terminal of said transistor, and said second grounding terminal is coupled to a base terminal of said transistor;
   wherein when said first grounding terminal is grounded, said transistor places said relay into said second state, and when said first and second grounding terminals are grounded, said transistor places said relay into said first state.

8. The receive antenna interface of claim 7, further comprising a filtering circuit coupled to said receiving antenna terminal to filter signals received by said receiving antenna.

9. The receive antenna interface of claim 7, further comprising a power source coupled to said control line, such that when said power source is disabled, said relay is placed in said first state.

10. The receive antenna interface of claim 7, wherein said relay has a switching delay of about 4 milliseconds or less.

11. The receive antenna interface of claim 7, further comprising a mode switch that is coupled between the base of said transistor and ground, such that when said relay is in said second state and said mode switch is closed, said relay is placed into said first state, such that said transmitting antenna terminal is coupled to said transceiver interface terminal.

12. The receive antenna interface of claim 11, wherein said mode switch is a momentary switch.

13. A system for transmitting and receiving signals comprising:
   a transceiver having a communication interface terminal and a ground-on-transmit terminal, said ground-on-transmit terminal having a fixed ground connection and a switched ground connection configured to be selectively grounded or ungrounded; and
   a receive antenna interface, said interface having:
   a chassis;
   a relay having transmitting and receiving antenna terminals that are adapted to be coupled to respective transmitting and receiving antennas, said transmitting antenna terminal being selectively coupled to said transceiver communication terminal in a first state, and said receiving antenna terminal being selectively coupled to said transceiver interface terminal in a second state, wherein said relay includes a control line; and
   a ground control circuit carried by said chassis, said ground control circuit coupled to said control line to control said states of said relay, said ground control circuit providing a transmit-ground connector having a first and a second grounding terminal that are coupled to the fixed ground connection and the switched ground connection of the ground-on-transmit connector respectively, said first and second ground terminals being electrically isolated from said chassis;
   wherein when the fixed ground connection of the ground-on-transmit connector is coupled to said first grounding terminal, said ground control circuit places said relay in said second state, and when the switched ground connection is switched to ground when said relay is in said second state, said ground control circuit places said relay in said first state.

14. The receive antenna interface of claim 13, further comprising a filtering circuit coupled to said receiving antenna terminal to filter signals received by said receiving antenna.

15. The receive antenna interface of claim 13, further comprising a power source coupled to said control line, such that when said power source is disabled, said relay is placed in said first state.

16. The receive antenna interface of claim 13, wherein said relay has a switching delay of about 4 milliseconds or less.

17. The receive antenna interface of claim 13, wherein said ground control circuit includes a mode switch that is operatively coupled between said relay and ground, such that when said mode switch is closed and said relay is in said second state, said relay is placed into said first state, such that said transmitting antenna terminal is coupled to said transceiver interface terminal.

18. The receive antenna interface of claim 17, wherein said mode switch is a momentary switch.

\* \* \* \* \*